US012669838B1

(12) United States Patent
Goyal et al.

(10) Patent No.: US 12,669,838 B1
(45) Date of Patent: Jun. 30, 2026

(54) REDUCTION OF BANDGAP VOLTAGE VARIATION IN AN INTEGRATED CIRCUIT

(71) Applicant: Cadence Design Systems, Inc., San Jose, CA (US)

(72) Inventors: Arun Goyal, Noida (IN); Amit Katyal, Noida (IN)

(73) Assignee: Cadence Design Systems, Inc., San Jose, CA (US)

( * ) Notice: Subject to any disclaimer, the term of this patent is extended or adjusted under 35 U.S.C. 154(b) by 0 days.

(21) Appl. No.: 18/909,113

(22) Filed: Oct. 8, 2024

(51) Int. Cl.
*G05F 1/56* (2006.01)
*G05F 1/46* (2006.01)

(52) U.S. Cl.
CPC . *G05F 1/56* (2013.01); *G05F 1/46* (2013.01)

(58) Field of Classification Search
CPC ... G05F 1/56; G05F 1/46; G05F 1/468; G05F 1/461; G05F 1/465; G05F 1/59; G05F 1/595; G05F 1/613; G05F 1/614; G05F 1/618; G05F 1/66; G05F 1/10; G05F 1/561; G05F 3/20; G05F 3/22; G05F 3/222; G05F 3/225; G05F 3/265; G05F 3/267
See application file for complete search history.

(56) References Cited

U.S. PATENT DOCUMENTS

2010/0164466 A1* 7/2010 Jo .............................. G05F 3/30
323/313

* cited by examiner

*Primary Examiner* — Jung Kim
(74) *Attorney, Agent, or Firm* — Mark H. Whittenberger; Holland & Knight LLP

(57) ABSTRACT

Circuits for reducing bandgap voltage variation including an operational amplifier and a first transistor configured to receive an output of the operational amplifier, a second transistor operatively connected to the first transistor, the second transistor configured to receive the output of the operational amplifier, and a digital calibration engine operatively connected with the operational amplifier, wherein the digital calibration engine trims an input associated with the operational amplifier to address a mismatch between the first transistor and the second transistor.

20 Claims, 8 Drawing Sheets

REDUCTION OF BANDGAP VOLTAGE VARIATION IN AN INTEGRATED CIRCUIT

FIELD OF THE INVENTION

The present disclosure relates to electronic circuits, and more particularly, to a circuit to reduce a bandgap voltage variation in an integrated circuit.

BACKGROUND

The bandgap voltage reference (BGR) serves as a critical element in analog integrated circuits, offering a stable voltage reference. However, inherent offset at the operational amplifier input and PMOS device mismatches often lead to significant variations in the bandgap voltage, impairing circuit performance. Prior solutions have primarily focused on mitigating operational amplifier offset alone, overlooking PMOS mismatches.

SUMMARY

In one or more embodiments of the present disclosure, circuit for reducing bandgap voltage variation is provided. The circuit may include an operational amplifier and a first transistor configured to receive an output of the operational amplifier. The circuit may further include a second transistor operatively connected to the first transistor, the second transistor configured to receive the output of the operational amplifier. The circuit may also include a digital calibration engine operatively connected with the operational amplifier, wherein the digital calibration engine trims an input associated with the operational amplifier to address a mismatch between the first transistor and the second transistor.

One or more of the following features may be included. The digital calibration engine may be configured to address the mismatch between the first transistor and the second transistor while an operational amplifier offset is corrected simultaneously. The circuit may include a first bipolar junction transistor operatively connected to an input of the operational amplifier and/or a second bipolar junction transistor operatively connected to an input of the operational amplifier. The circuit may further include a third transistor and a resistor configured to activate the first transistor and second transistor. Simultaneously correcting may occur in a single trim. Activating the first transistor and the second transistor may occur during a calibration mode. The circuit may also include a first switch located between the second transistor and the third transistor. The first bipolar junction transistor and the second bipolar junction transistor may have the same characteristics. The circuit may further include a second switch located between the operational amplifier and the first transistor and the second transistor.

In one or more embodiments of the present disclosure, a method for reducing bandgap voltage variation is provided. The method may include providing an operational amplifier and receiving an output of the operational amplifier at a first transistor. The method may further include operatively connecting a second transistor with the first transistor, the second transistor configured to receive the output of the operational amplifier. The method may also include trimming, using a digital calibration engine operatively connected with the operational amplifier, an input associated with the operational amplifier to address a mismatch between the first transistor and the second transistor.

One or more of the following features may be included. The method may include simultaneously correcting a mismatch between the first transistor and the second transistor and an operational amplifier offset. The method may also include operatively connecting a first bipolar junction transistor to an input of the operational amplifier and/or operatively connecting a second bipolar junction transistor to an input of the operational amplifier. The method may further include activating the first transistor and second transistor using a third transistor and a resistor. Simultaneously correcting may occur in a single trim. Activating the first transistor and the second transistor may occur during a calibration mode. The method may also include providing a first switch between the second transistor and the third transistor. The first bipolar junction transistor and the second bipolar junction transistor may have the same characteristics. The method may further include providing a second switch between the operational amplifier and the first transistor and the second transistor.

Additional features and advantages of embodiments of the present disclosure will be set forth in the description which follows, and in part will be apparent from the description, or may be learned by practice of embodiments of the present disclosure. The objectives and other advantages of the embodiments of the present disclosure may be realized and attained by the structure particularly pointed out in the written description and claims hereof as well as the appended drawings.

It is to be understood that both the foregoing general description and the following detailed description are exemplary and explanatory and are intended to provide further explanation of embodiments of the invention as claimed.

BRIEF DESCRIPTION OF THE DRAWINGS

The accompanying drawings, which are included to provide a further understanding of embodiments of the present disclosure and are incorporated in and constitute a part of this specification, illustrate embodiments of the present disclosure and together with the description serve to explain the principles of embodiments of the present disclosure.

DETAILED DESCRIPTION

Figure 1:
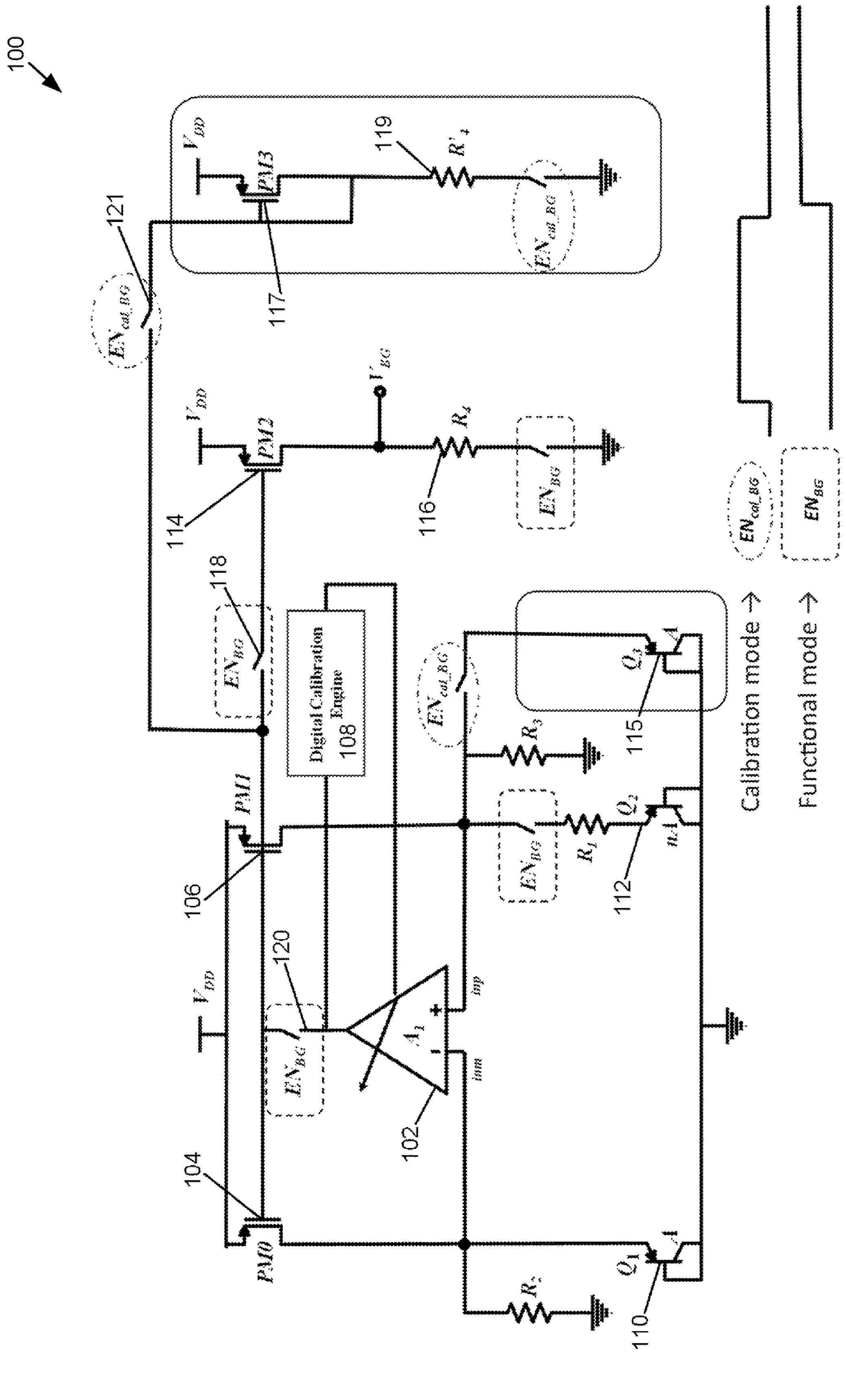
FIG. 1 shows an example circuit consistent with embodiments of the present disclosure.

The bandgap voltage reference (BGR) serves as a critical element in analog integrated circuits, offering a stable voltage reference. However, the inherent offset at the operational amplifier input and PMOS device mismatches often lead to significant variations in the bandgap voltage, impairing circuit performance. Prior solutions have primarily focused on mitigating operational amplifier offset alone, overlooking PMOS mismatches.

Accordingly, embodiments of the present disclosure may integrate both challenges, utilizing the operational amplifier differential pair trimming method to address the offset from both the operational amplifier and PMOS mismatches. As such, embodiments included herein may enhance the reliability of the bandgap voltage reference, promising superior performance across analog integrated circuits.

Reference will now be made in detail to the embodiments of the present disclosure, examples of which are illustrated in the accompanying drawings. The present disclosure may, however, be embodied in many different forms and should not be construed as being limited to the embodiments set forth herein; rather, these embodiments are provided so that this disclosure will be thorough and complete, and will fully convey the concept of the present disclosure to those skilled in the art. Like reference numerals in the drawings denote like elements.

As used in any embodiment described herein, "circuit" or "circuitry" may include, for example, singly or in any combination, hardwired circuitry, programmable circuitry, state machine circuitry, and/or firmware that stores instructions executed by programmable circuitry. It should be understood at the outset that any of the operations and/or operative components described in any embodiment herein may be implemented in software, firmware, hardwired circuitry and/or any combination thereof.

Typically, in order to generate a proportional to absolute temperature (PTAT) voltage in a BGR, an operational amplifier is employed, and the operational amplifier offset may be removed by trimming its input pairs. An offset is generally present at the input of the operational amplifier in a BGR due to the mismatch between the bipolar junction transistors, PMOS, and resistors, resulting in a high variation in the bandgap voltage. The predominant factor contributing to the variation in BGR voltage is MOS mismatch. To mitigate the impact of mismatch, the strategy of stacking MOS may be employed, albeit with the trade-off of increased silicon area.

Referring now to FIG. 1, a circuit 100 for reducing bandgap voltage variation consistent with embodiments of the present disclosure is provided. Circuit 100 may include operational amplifier 102 and first transistor 104 configured to receive an output of operational amplifier 102. Circuit 100 may further include second transistor 106 operatively connected to first transistor 104, second transistor 106 configured to receive the output of operational amplifier 102. Circuit 100 may also include digital calibration engine 108 operatively connected with operational amplifier 102. Digital calibration engine 108 may be configured to trim an input associated with operational amplifier 102 to address a mismatch between first transistor 104 and second transistor 106.

In some embodiments, digital calibration engine 108 may be configured to address the mismatch between the first transistor 104 and the second transistor 106 while an operational amplifier offset is corrected simultaneously. Circuit 100 may include a first bipolar junction transistor 110 operatively connected to an input of the operational amplifier 102 and/or a second bipolar junction transistor 112 operatively connected to an input of the operational amplifier 102. Circuit 100 may further include a third transistor 114 and a resistor 116 configured to activate the first transistor 104 and second transistor 106. Simultaneously correcting may occur in a single trim. Activating first transistor 104 and second transistor 106 may occur during a calibration mode. Circuit 100 may also include a first switch 118 located between the second transistor 106 and the third transistor 114. First bipolar junction transistor 110 and second bipolar junction transistor 112 may have similar properties. Circuit 100 may further include second switch 120 located between operational amplifier 102 and first transistor 104 and second transistor 106. Bipolar junction transistor 115 (Q3) may be connected to operational amplifier 102 in a calibration mode and second bipolar junction transistor 112 (Q2) may be connected in a functional mode. Transistor 117 (PM3) and resistor 119 (R'4) may be operatively connected to first transistor 104 (PM0) and second transistor 106 (PM1) in calibration mode, configured to activate the first transistor 104 and second transistor 106, connected through switch 121. Third transistor 114 (PM2) and resistor 116 (R4) may be configured to activate first transistor 104 and second transistor 106 in functional mode. These may be connected through switch 118. In a calibration mode switches ($EN_{cal\_BG}$) may be connected while in a functional mode switches (ENBG) may be connected in the design.

In operation, circuit 100 may address the mismatch removal of first transistor 104 and second transistor 106. Circuit 100 may address the issue of mismatch between the bandgap transistors 104, 106 by utilizing a calibration mode to trim the input MOS of operational amplifier 102. This ensures uniform behavior and reduces variations in the bandgap voltage.

In some embodiments, and in contrast with existing solutions that only addressed operational amplifier offset, embodiments of the present disclosure address both operational amplifier offset and PMOS mismatch simultaneously, optimizing the functionality of the bandgap voltage reference. Embodiments included herein may utilize existing trimming approaches in order to leverage the operational amplifier differential pair trimming method for offset elimination due to both operational amplifier and PMOS mismatch streamlines the design process, making it efficient and area-effective. Embodiments included herein deliver improved performance in terms of reduced variations in the bandgap voltage, leading to enhanced precision and accuracy in analog circuitry applications.

Figure 2:
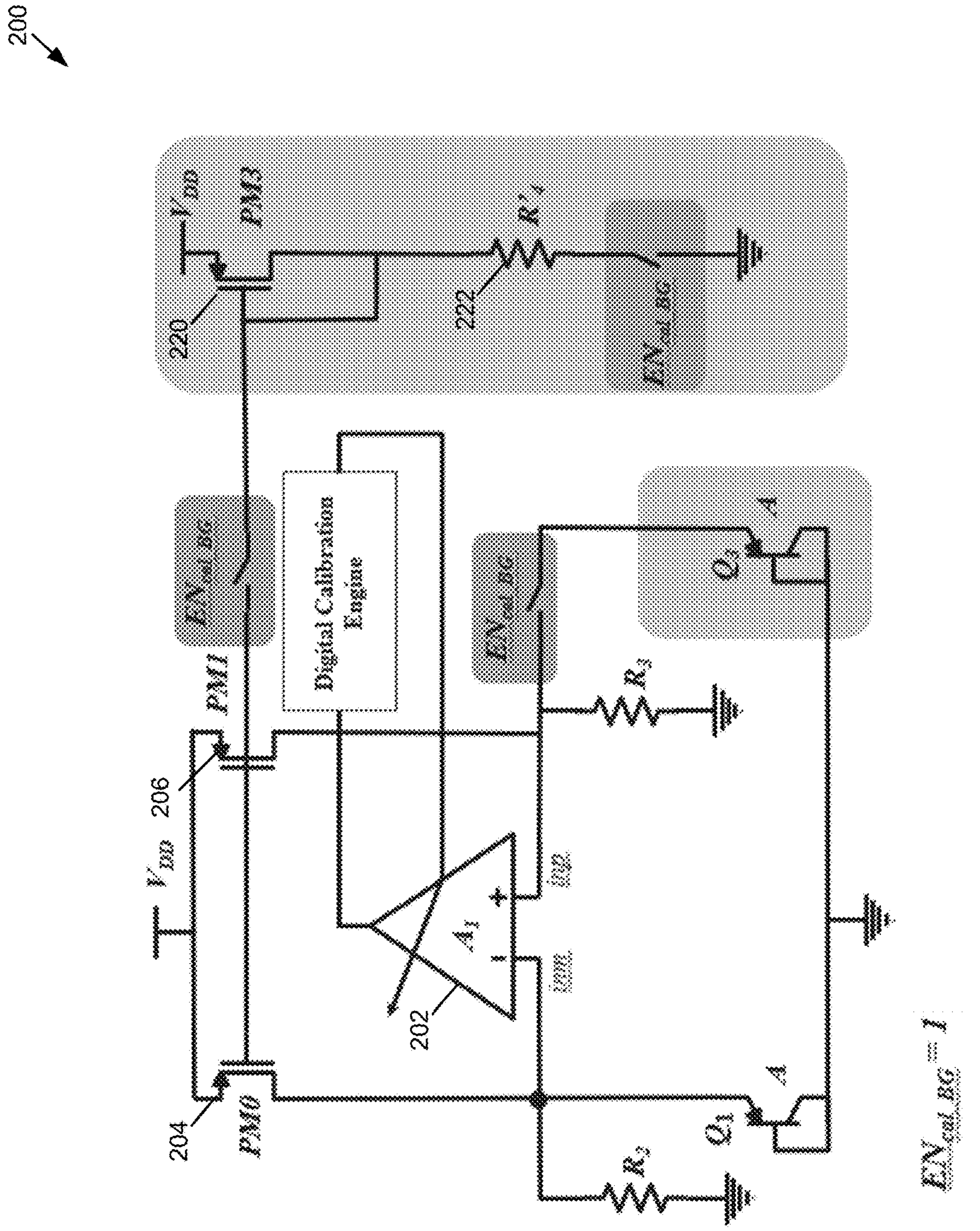
FIG. 2 shows an example circuit during a calibration mode consistent with embodiments of the present disclosure.

Referring now to FIG. 2, a circuit 200 for reducing bandgap voltage variation consistent with embodiments of the present disclosure is provided. Circuit 200 depicts a calibration mode in accordance with embodiments of the present disclosure. In operation, during a calibration mode, a BJT Q3 that may be identical to Q1 may be introduced at the input node of the operational amplifier to ensure uniform behavior at both operational amplifier inputs. The operational amplifier input MOS are then trimmed until the operational amplifier output flips. This process effectively eliminates operational amplifier offset and mitigates the mismatch between PM0 and PM1 through the operational amplifier input trimming method.

In some embodiments, transistor 220 (PM3) and resistor 222 ($R'_4$) devices have been newly introduced to generate a current that activates the first transistor 204 and second transistor 206 (PM0 and PM1) branches, thereby producing the Vbe voltage at the inputs of operational amplifier 202.

Figure 3:
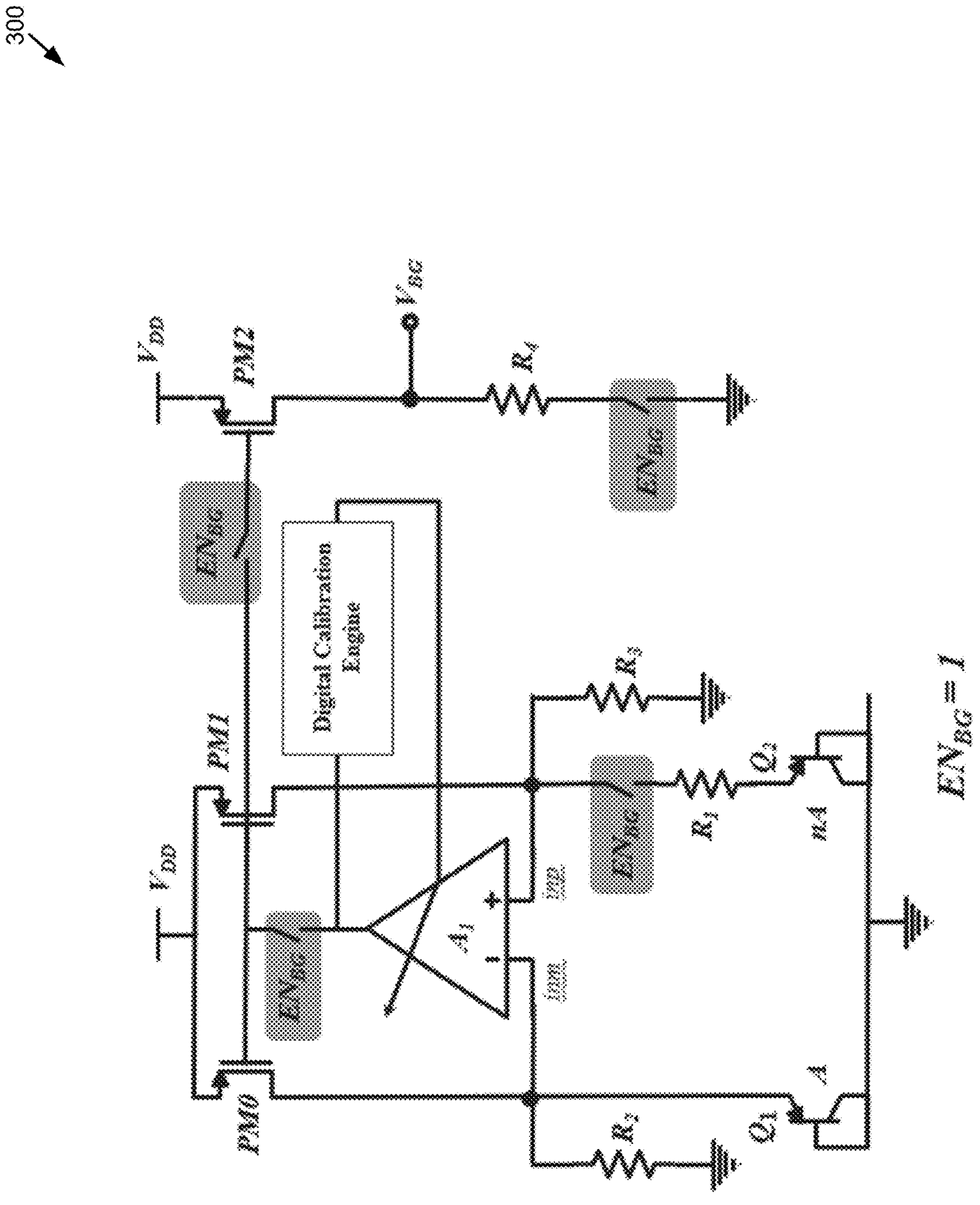
FIG. 3 shows an example circuit during a functional mode consistent with embodiments of the present disclosure.

Referring now to FIG. 3, a circuit 300 for reducing bandgap voltage variation consistent with embodiments of the present disclosure is provided. Circuit 300 depicts a functional mode in accordance with embodiments of the present disclosure. In operation, during a functional mode, embodiments included herein may provide a reduced variation of VBG voltage.

Figure 4:
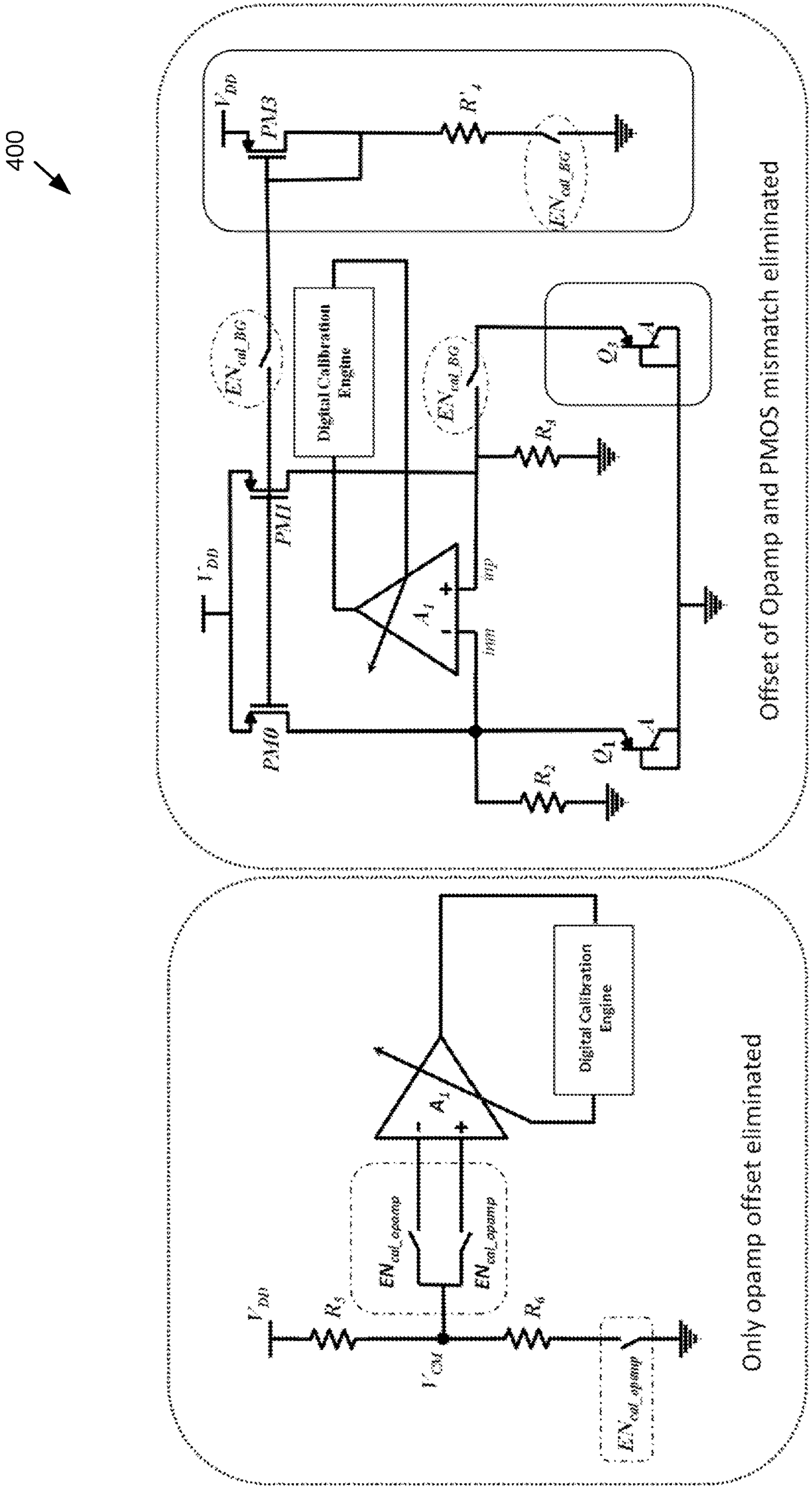
FIG. 4 shows a comparison between an existing circuit and a circuit consistent with embodiments of the present disclosure.

Referring now to FIG. 4, a circuit 400 for reducing bandgap voltage variation consistent with embodiments of the present disclosure is provided. Circuit 400 depicts a comparison between an existing circuit and a circuit 400 consistent with embodiments of the present disclosure. As shown in the diagram the existing approach may eliminate only the operational amplifier offset while circuit 400 may address both the operational amplifier offset and eliminate the PMOS mismatch. In some embodiments, this may be achieved using a single trim.

Figure 5:
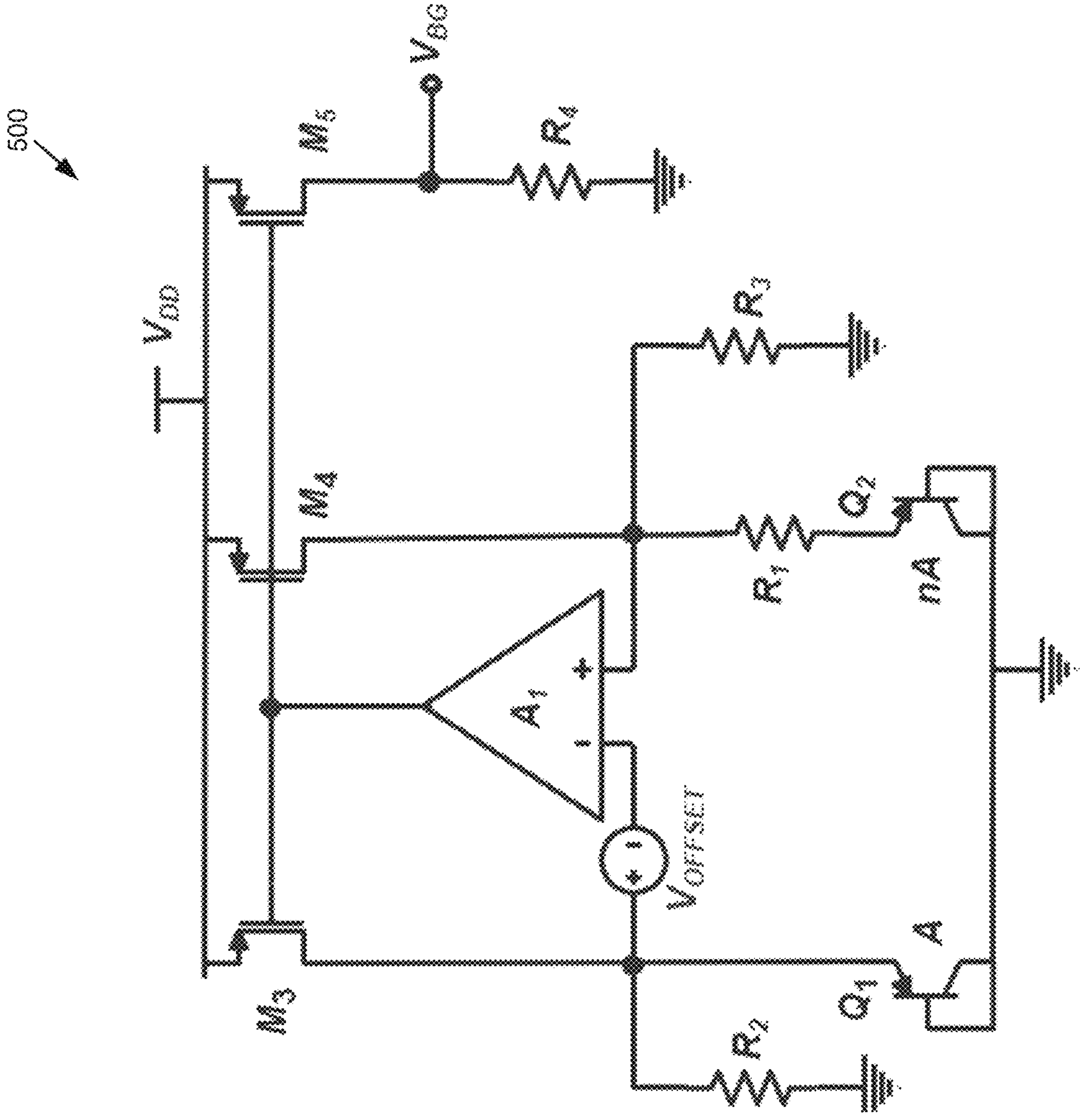
FIGS. 5-7 show circuits consistent with embodiments of the present disclosure.

Referring now to FIG. 5, a circuit 500 for reducing bandgap voltage variation consistent with embodiments of the present disclosure is provided. Circuit 500 shows one potential operation of a circuit in accordance with embodiments included herein. In this example, $V_{OFFSET}$ may refer to the offset voltage at the input of op-amp because of bandgap circuit (op-amp offset is zero).

$$V_{BG} = \left(\frac{V_{eb1} - Veb2}{R1} + \frac{V_{eb1}}{R2}\right) * R_4 \quad \text{EQUATION 1}$$

When $V_{OFFSET} = 0$

Impact of this offset voltage at the output of bandgap voltage $V_{BG}$ is provided by:

EQUATION 2

$$V_{BG\_offset} = \left(\frac{V_{eb1} - V_{offset} - Veb2}{R1} + \frac{V_{eb1} - V_{offset}}{R2}\right) * R_4$$

$$V_{BG\_offset} = VBG - \left(Voffset * \left(\frac{R4}{R1} + \frac{R4}{R2}\right)\right) \quad \text{EQUATION 3}$$

The offset voltage may be multiplied by the bandgap gain added to the output of bandgap voltage $V_{BG}$. This voltage $$\left(V_{offset} * \left(\frac{R4}{R1} + \frac{R4}{R2}\right)\right)$$

may increase the variation in bandgap output voltage. In some embodiments, circuits included herein may eliminate the $V_{offset}$ when using a digital calibration method that may employ the same operational amplifier.

Figure 6:
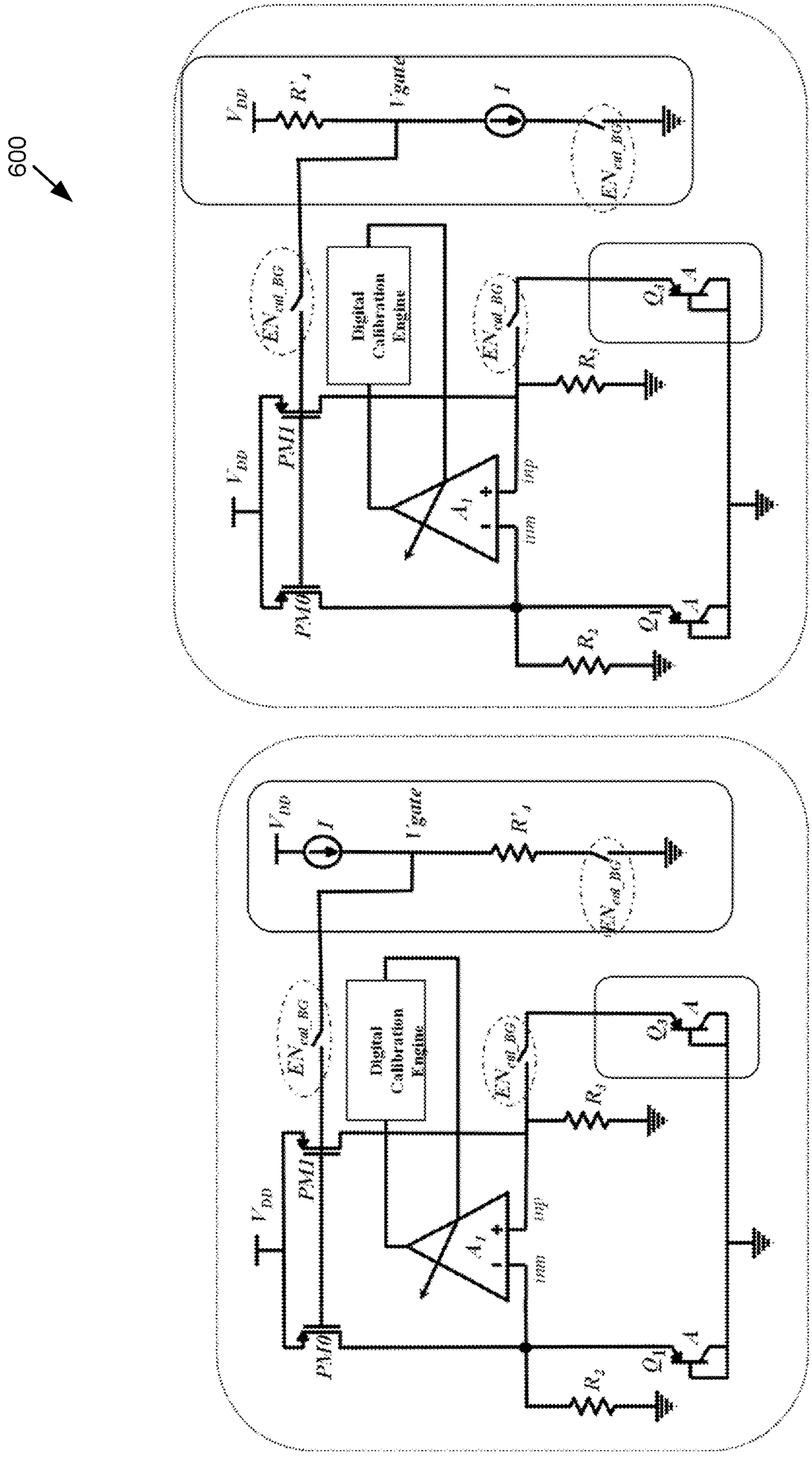

Referring now to FIG. 6, a circuit 600 for reducing bandgap voltage variation by eliminating current mirror mismatch consistent with embodiments of the present disclosure is provided. Circuit 600 depicts a calibration mode in accordance with embodiments of the present disclosure. In operation, during a calibration mode, the PM0 and PM1 gate voltage (Vgate) may be generated by a current, which may be external, or a mirror circuit as shown in the left side of FIG. 6. Here, Vgate=I*R'4. This current and resistor can also be flipped as is shown in the circuit in the right side of FIG. 6. Here, Vgate=vdd−I*R'4.

Figure 7:
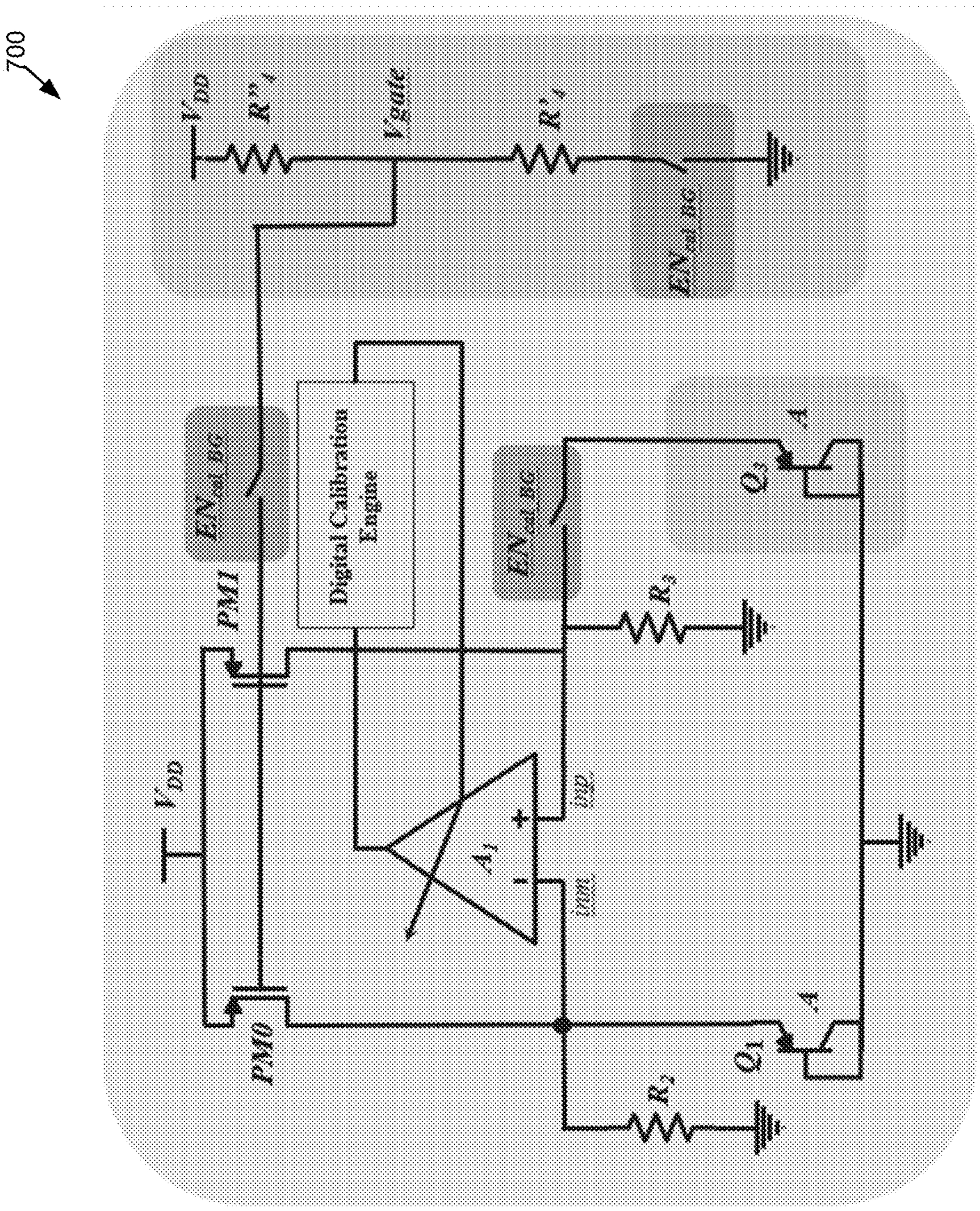

Referring now to FIG. 7, a circuit 700 for reducing bandgap voltage variation by eliminating current mirror mismatch consistent with embodiments of the present disclosure is provided. Circuit 700 depicts a calibration mode in accordance with embodiments of the present disclosure. In operation, during a calibration mode, PM0 and PM1 gate voltage (Vgate) may be generated by resistor divider circuit $$Vgate = \frac{R'4}{R'4 + R''4}.$$

Figure 8:
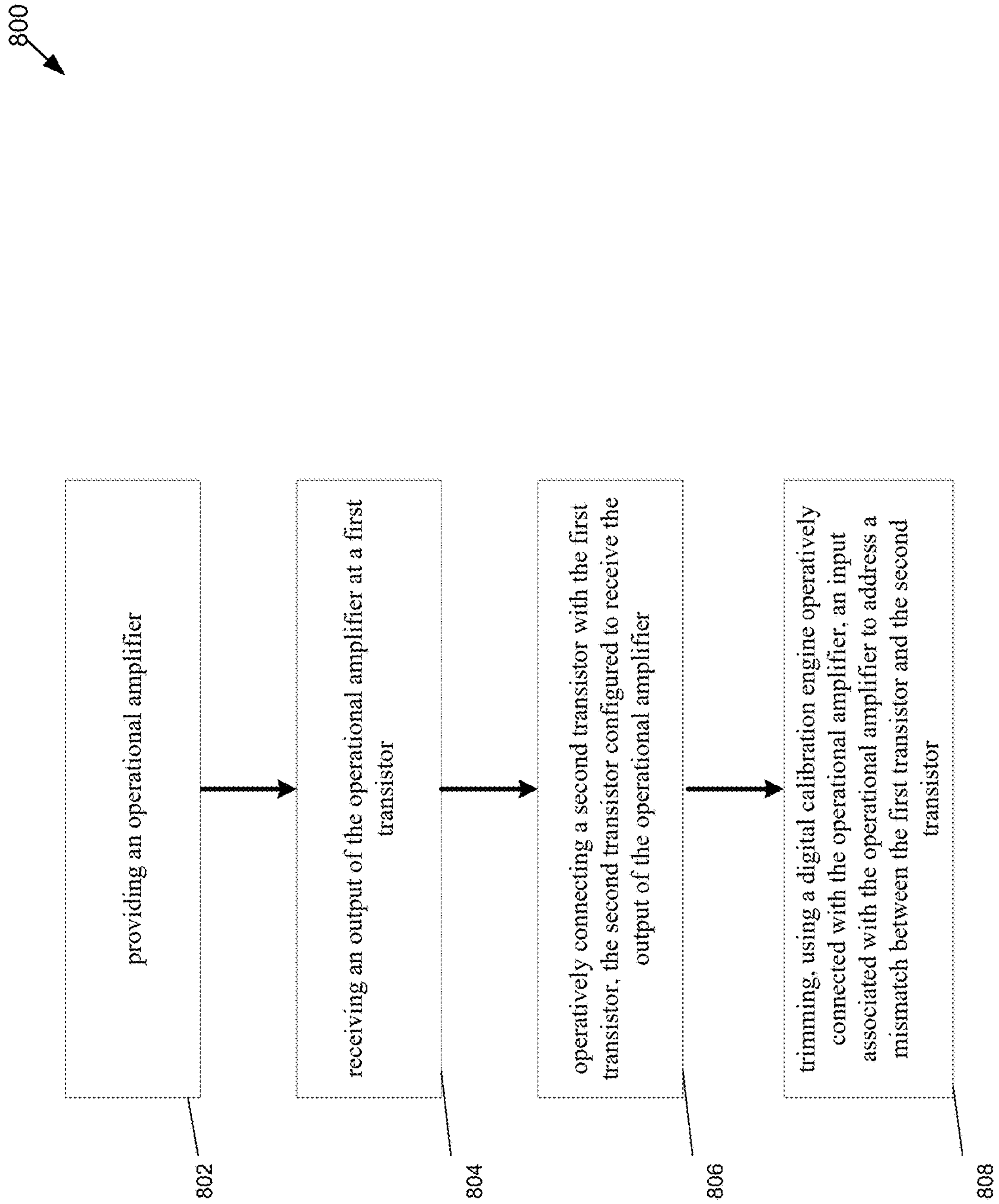
FIG. 8 shows a flowchart showing operations consistent with embodiments of the present disclosure.

Referring now to FIG. 8, a flowchart 800 showing operations consistent with embodiments of the present disclosure is provided. Flowchart 800 depicts one possible method for use with a circuit. The method may include providing (802) an operational amplifier and receiving (804) an output of the operational amplifier at a first transistor. The method may further include operatively connecting (806) a second transistor with the first transistor, the second transistor configured to receive the output of the operational amplifier. The method may also include trimming (808), using a digital calibration engine operatively connected with the operational amplifier, an input associated with the operational amplifier to address a mismatch between the first transistor and the second transistor. Numerous other operations are also within the scope of the present disclosure.

As discussed above, the BGR is a crucial component in analog integrated circuits that provides a stable voltage reference. In BGR, an offset is always present at the input of the operational amplifier and mismatch between PMOS devices cause a high variation in bandgap voltage. Existing approaches focused solely on eliminating the operational amplifier offset through the differential pair trimming technique. Embodiments included herein address both issues by leveraging the existing operational amplifier differential pair trimming method to eradicate offset arising from the operational amplifier and PMOS mismatches. This approach promises to enhance the reliability of the bandgap voltage reference, thus improving the overall performance of analog integrated circuits.

It will be apparent to those skilled in the art that various modifications and variations can be made in embodiments of the present disclosure without departing from the spirit or scope of the invention. Thus, it is intended that embodiments of the present disclosure cover the modifications and variations of this invention provided they come within the scope of the appended claims and their equivalents.

What is claimed is:

1. A circuit for reducing bandgap voltage variation comprising:

an operational amplifier;

a first transistor configured to receive an output of the operational amplifier;

a second transistor operatively connected to the first transistor, the second transistor configured to receive the output of the operational amplifier; and a digital calibration engine operatively connected with the operational amplifier, wherein the digital calibration engine trims an input of the operational amplifier to address a mismatch between the first transistor and the second transistor.

2. The circuit of claim 1, wherein the digital calibration engine is configured to address the mismatch between the first transistor and the second transistor while an operational amplifier offset is corrected simultaneously.

3. The circuit of claim 1, further comprising:

a first bipolar junction transistor operatively connected to an input of the operational amplifier.

4. The circuit of claim 3, further comprising:

a second bipolar junction transistor operatively connected to an input of the operational amplifier.

5. The circuit of claim 4, further comprising:

a third transistor and a resistor configured to activate the first transistor and second transistor.

6. The circuit of claim 2, wherein the simultaneously correcting occurs in a single trim.

7. The circuit of claim 5, wherein activating the first transistor and the second transistor occurs during a calibration mode.

8. The circuit of claim 5, further comprising:

a first switch located between the second transistor and the third transistor.

9. The circuit of claim 4, wherein the first bipolar junction transistor and the second bipolar junction transistor have the same characteristics.

10. The circuit of claim 1, further comprising:

a second switch located between the operational amplifier and the first transistor and the second transistor.

11. A method for reducing bandgap voltage variation comprising:

providing an operational amplifier;

receiving an output of the operational amplifier at a first transistor;

operatively connecting a second transistor with the first transistor, the second transistor configured to receive the output of the operational amplifier; and trimming, using a digital calibration engine operatively connected with the operational amplifier, an input of the operational amplifier to address a mismatch between the first transistor and the second transistor.

12. The method of claim 11, further comprising:

simultaneously correcting a mismatch between the first transistor and the second transistor and an operational amplifier offset.

13. The method of claim 11, further comprising:

operatively connecting a first bipolar junction transistor to an input of the operational amplifier.

14. The method of claim 13, further comprising:

operatively connecting a second bipolar junction transistor to an input of the operational amplifier.

15. The method of claim 14, further comprising:

activating the first transistor and second transistor using a third transistor and a resistor.

16. The method of claim 12, wherein the simultaneously correcting occurs in a single trim.

17. The method of claim 15, wherein activating the first transistor and the second transistor occurs during a calibration mode.

18. The method of claim 15, further comprising:

providing a first switch between the second transistor and the third transistor.

19. The method of claim 14, wherein the first bipolar junction transistor and the second bipolar junction transistor have the same characteristics.

20. The method of claim 11, further comprising:

providing a second switch between the operational amplifier and the first transistor and the second transistor.

* * * * *